(12) United States Patent
Kato et al.

(10) Patent No.: US 6,817,456 B2
(45) Date of Patent: Nov. 16, 2004

(54) DYNAMIC DAMPER FOR STEERING SYSTEM

(75) Inventors: Rentaro Kato, Kasugai (JP); Takahiro Aoi, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/113,606

(22) Filed: Mar. 28, 2002

(65) Prior Publication Data

US 2002/0144873 A1 Oct. 10, 2002

(30) Foreign Application Priority Data

Mar. 30, 2001 (JP) ........................................ 2001-100769
Mar. 30, 2001 (JP) ........................................ 2001-102301

(51) Int. Cl.$^7$ ................................................. F16F 7/10
(52) U.S. Cl. ...................................................... 188/380
(58) Field of Search ................................ 188/378, 379, 188/380; 74/492, 552

(56) References Cited

U.S. PATENT DOCUMENTS

| 3,181,850 | A | * | 5/1965 | Bajer | ........................... 267/153 |
| 4,712,446 | A | * | 12/1987 | Kamata et al. | ................ 74/492 |
| 4,852,848 | A | * | 8/1989 | Kucera | ........................ 188/379 |
| 5,097,720 | A | * | 3/1992 | Drefahl | ......................... 74/552 |
| 5,967,269 | A | * | 10/1999 | Kato | ........................... 188/380 |
| 6,508,343 | B2 | * | 1/2003 | Misaji et al. | ................. 188/379 |
| 6,554,112 | B2 | * | 4/2003 | Kato et al. | .................... 188/379 |

FOREIGN PATENT DOCUMENTS

| JP | 03082691 A | * | 4/1991 | ........... B62K/21/20 |
| JP | 03-0826691 A | * | 4/1991 | .................. 74/492 |
| JP | B-7-14716 | | 2/1995 | |
| JP | A-1996-127347 | | 5/1996 | |
| JP | B-2824382 | | 9/1998 | |
| JP | A-10-267075 | | 10/1998 | |
| JP | A-2001-71916 | | 3/2001 | |

* cited by examiner

Primary Examiner—Thomas Williams
(74) Attorney, Agent, or Firm—Beyer Weaver & Thomas, LLP

(57) ABSTRACT

Disclosed is a dynamic damper for use in a steering system of an automotive vehicle, including a mounting member connectable to a steering column or a steering wheel of the steering system; and a plurality of secondary vibration systems independent of each other, each including a mass member and a spring member for elastically supporting the mass member to the mounting member. One of the plurality of secondary vibration systems has a natural frequency that is tuned to an idling vibration frequency band ranging from about 20 Hz to about 30 Hz, and another one of the plurality of secondary vibration systems has a natural frequency that is tuned to a natural frequency band of the steering system, which is larger than 30 Hz.

19 Claims, 10 Drawing Sheets

DYNAMIC DAMPER FOR STEERING SYSTEM

INCORPORATED BY REFERENCE

The disclosures of Japanese Patent Application Nos. 2001-100769 and 2001-102301 both filed on Mar. 30, 2001 each including the specification, drawings and abstract, are incorporated herein by reference in their entirety.

BACKGROUND OF THE INVENTION

1. Field of the Invention

The present invention relates to a dynamic damper for use in a steering system of an automotive vehicle, which is adapted to be fixed to a steering column or a steering wheel for the purpose of absorbing vibrations excited in the steering wheel.

2. Description of the Related Art

A steering wheel of an automotive vehicle is a member for allowing an operator of the vehicle to steer the vehicle. The operator of the vehicle almost always handles directly the steering wheel during driving the vehicle, and eventually is able to sensitively feel minute vibrations excited in the steering wheel. Since the vibrations excited in the steering wheel greatly impact on a riding comfort of the vehicle as felt by the operator, there has been a great regard for absorbing the vibrations excited in the steering wheel.

In an attempt to damp or attenuate vibrations excited in the steering wheel, a dynamic damper has been mounted on the steering wheel or other members of the steering system, thereby providing a secondary vibration system for the steering system as a primary vibration system. A natural frequency of the secondary vibration system is tuned to a natural frequency of the steering system, so that the vibrations excited in the steering wheel may be damped.

An extensive study of the dynamic damper for use in the steering system conducted by the present inventors has revealed the fact that the adoption of the conventional dynamic damper does not always effectively prevent the vibrations of the steering wheel, especially in recent automotive vehicles.

SUMMARY OF THE INVENTION

It is therefore one object of this invention to provide a dynamic damper for use in a steering system, which is novel in construction and which is capable of exhibiting an excellent vibration damping effect with respect to vibrations excited in a steering wheel of the steering system in an effective and stable manner.

In order to achieve this object of the invention, the present inventors has conducted eager studies of steering systems adopted in recent automotive vehicles, and has revealed that a natural frequency of the steering system has been shifted to a high frequency band as a result of a recent tendency for steeling wheels to be made of light metals including aluminum alloy and a magnesium alloy rather than conventionally employed ferrous metals, for the purpose of improving a steeling feeling.

Further intensive studies of the steering systems carried by the present inventors has also revealed that a frequency band of idling vibrations acting on the steering wheel has been shifted to a low frequency band as a result of a recent tendency for decreasing an engine speed of an internal combustion engine during its idling state for the purpose of improving fuel economy.

Also, the present inventors has studied about automotive vehicles equipped with the conventional steeling wheel whose reinforcing member is made of ferrous metal, and has revealed that the steeling system equipped with the conventional steeling wheel generally has a natural frequency at around 20–30 Hz, which is approximately identical with the frequency band of the idling vibration excited in the general conventional automotive vehicle.

With the above-described revealed facts taken into synthetic consideration, it may be concluded that the vibrations, e.g., the idling vibration, excited in the steering wheel of the conventional steering system has been effectively damped by attaching a single dynamic damper to the steering wheel or the steering column of the steeling system, and by tuning a natural frequency of the single dynamic damper to the natural frequency band of the steeling system. However, the recent development in the automobile technology provides not only the above-indicated structural change in the steeling system but the above-indicated change in the internal combustion engine as well. Eventually, the conventional dynamic damper becomes incapable of exhibiting a desired vibration damping effect with respect to the vibrations excited in the steeling wheel. In particular, the conventional dynamic damper is tuned on the basis of the natural frequency of the steeling system, so that the use of the conventional dynamic damper in the recent automotive vehicles may cause undesirable deterioration of vibration conditions of the steeling wheel at a lower and higher frequency bands adjacent to the tuning frequency of the dynamic damper (i.e., the natural frequency of the steering system). In addition, since the frequency band of the idling vibrations is made lower than the natural frequency of the steering system in the recent vehicle, the conventional dynamic damper attached to the steeling system of the recent vehicle may conversely deteriorate the vibration conditions of the steeling wheel in comparison with the case where no dynamic damper is attached to the steeling system. For the above reasons, the present inventors could theorize the tendency of deterioration of the vibration condition in the steering system of the recent vibrations.

In addition, the present inventors has studied about a tilting type steering system that has been widely adopted in the recent automotive vehicles, and revealed that the natural frequency of the tilting type steering system sometimes changes when the position of the steering wheel is changed by means of a steering-wheel position mechanism of the tilting type steering system. That is, the natural frequency of the tilting type steering system may deviate from the tuning frequency of the dynamic damper depending upon the position of the steering wheel, inevitably deteriorating the vibration condition of the steering wheel.

The present invention has been developed on the basis of the above-described knowledge acquired by the present inventor through their eager studies of the steering system, and provides a dynamic damper to cope with the problem of vibrations in the recent steering wheel.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principal of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A dynamic damper for use in a steering system of an automotive vehicle, comprising: (a) a mounting member adapted to be fixed to a steering column or a steering wheel of the steering system; and (b) a plurality of secondary vibration systems each including a mass member and a spring member for elastically supporting the mass member with respect to the mounting member, the plurality of secondary vibration systems being independent of each other, wherein at least one of the plurality of secondary vibration systems has a natural frequency that is tuned to an idling vibration frequency band ranging from about 20 Hz to about 30 Hz, and at least an other one of the plurality of secondary vibration systems has a natural frequency that is tuned to a natural frequency band of the steering system, which is larger than 30 Hz.

As discussed above, the present inventors has studied in detail about vibrations excited in the steering system, which has not sufficiently been regarded or clarified conventionally, and theoretically and experimentally recognizes that the use of a plurality of dynamic dampers one of which is tuned to the natural frequency of the steering system, and another of which is tuned to the idling vibration frequency band, is effective in order to damp vibrations excited in the steering wheel. In view of the above, the dynamic damper of the present invention includes a plurality, e.g., two of the secondary vibration systems, which are substantially independent of each other and tuned to the natural frequency of the steering system and the idling vibration frequency band, respectively. Thus, the present dynamic damper is capable of stably exhibiting a high damping effect with respect to the vibrations excited in the steeling wheel, if the dynamic damper is mounted on the steering system of the recent vehicle.

(2) A dynamic damper according to the above indicated mode (1), wherein the steering wheel of the steering system includes a reinforcing member made of light metal including an aluminum alloy and an magnesium alloy. In this mode of the invention, one of the plurality of the second vibration systems is tuned to the natural frequency of the steering system, although the natural frequency of the steering system is made higher than the idling vibration frequency due to the use of the reinforcing member made of the light metal. Thus, the dynamic damper of this mode of the invention is capable of preventing resonance of the steering wheel upon application of a vibrational load whose frequency is higher than the idling vibration frequency.

(3) A dynamic damper according to the above-indicated modes (1) or (2), wherein the spring member of each of the secondary vibration systems whose natural frequencies are tuned to the idling vibration frequency band and the natural frequency band of the steering system, comprises an elastic support member adapted to undergo shear deformation in a direction perpendicular to a central axis of the steering column. In this mode of the invention, the spring member is able to exhibit a relatively low spring constant, in comparison with the case where the spring member is adapted to undergo compression deformation, making it possible to tune the natural frequency of each of the secondary vibration systems to the natural frequency of the steering system or the idling vibration frequency band, while avoiding or minimizing an enlargement of the mass member and deterioration of the durability of the spring member.

(4) A dynamic damper according to the above indicated mode (3), wherein the elastic support member of each of the secondary vibration systems whose natural frequencies are tuned to the idling vibration frequency band and the natural frequency of the steering system, has a circular shape in cross section extending in the direction perpendicular to the central axis of the steering column. In this mode of the invention, the dynamic damper is able to eliminate or minimize the possibility of undesirable changes in the natural frequency of each secondary vibration system, if a vibration input direction with respect to the spring member changes due to the turning of the steering wheel, for example. Thus, the dynamic damper of this mode of the invention is capable of exhibiting an excellent vibration damping effect with high stability, with respect to vibrations applied thereto in different radial directions.

(5) A dynamic damper according to the above-indicated mode (3) or (4), wherein at least one of said each of said secondary vibration system is arranged such that the elastic support member has a principal elastic axis that is approximately in conformity with a principal inertia axis of the mass member in a direction in which the mass and the mounting member are opposed to each other. In this mode of the invention, the dynamic damper is able to stabilize vibration attitude or condition of the mass member upon application of the vibrational load in radial directions perpendicular to the central axis of the steering column, making it possible for the dynamic damper to exhibit a desired vibration damping effect in a more effective and stabile manner.

In this mode (5) of the invention, the principal elastic axis of the elastic support member may preferably be located close to a center of gravity of the mass member, for thereby further stabilizing vibration attitude of the mass member. Namely, this arrangement is effective to prevent or minimize a rotative or a tilting motion of the mass member when the dynamic damper is subjected to the vibration in the direction perpendicular to its central axis, permitting the dynamic damper to exhibit a desired vibration damping effect in a further effective and stable manner. In order to locate the principal elastic axis of the elastic support member close to the center of gravity of the mass member, the dynamic damper may have a variety of configuration. For instance, the mass member may have a cylindrical shape and is disposed radially outwardly of the elastic support member so as to protrude toward the side of the bracket, so that the principal elastic axis of the elastic support member is located close to the center of gravity of the mass member effectively.

(6) A dynamic damper according to any one of the above-indicated modes (1)–(5), wherein the spring member of at least one of the plurality of secondary vibration systems comprises a plurality of elastic support members extending parallel to each other while having a circular cross section.

According to this mode of the invention, the spring member is composed of the plurality of elastic support members each having a circular shape in cross section, so that each elastic support member can exhibit substantially the same spring characteristics in all radial directions perpendicular to its axial direction. As a result, the dynamic damper is capable of exhibiting substantially the same damping characteristics with respect to the vibrations applied thereto in various radial directions perpendicular to the central axes of the elastic support members. While the dynamic damper for use in the steering system is likely to be subjected to vibrations whose directions vary in various radial directions perpendicular to the central axis of the steering column due to the turning of the steeling wheel, the dynamic damper of this mode of the invention is able to function as the effective secondary vibration system with respect to the vibrations applied thereto in the various radial directions.

In addition, the use of the spring member in the form of the plurality of elastic support members makes it possible to dispose the elastic support members on respective portions remote from the center of gravity of the mass member, for elastically supporting the mass member by the spring member. Namely, this arrangement makes it possible to position actual support points of the elastic support members for supporting the mass member on the portions remote from the center of gravity of the mass member, thus assuring an excellent stiffness of the spring member (i.e., the plurality of the elastic support members) in its entirety for supporting the mass member upon rotation of the mass member. Therefore, the dynamic damper of this mode is able to exhibit a desired vibration damping effect with high stability.

(7) A dynamic damper according to the above-indicated mode (6), wherein the plurality of elastic support members are located close to an outer peripheral portion of the mass member rather than a center of gravity of the mass member, in a plane perpendicular to central axes of the plurality of elastic support members. In this mode of the invention, the elastic support members cooperate to elastically support the mass member with further improved stability, while preventing irregular deformation of the mass member. Thus, the dynamic damper of this mode is able to exhibit a desired vibration damping effect with further improved stability.

(8) A dynamic damper according to the above indicated mode (6), wherein a general principal elastic center of the plurality of elastic support members extends in a direction of central axes of the plurality of elastic support members, and is approximately in conformity with a principal inertia axis of the mass member. This arrangement is effective to stabilize a vibration attitude or condition of the mass member upon application of the vibrational load in the directions perpendicular to the central axes of the elastic support members, so that the dynamic damper is able to exhibit the desired vibration damping effect with high stability. This mode of the invention may effectively embodied, such that the plurality of elastic support members are disposed on a circumference about the principal inertia axis of the mass member so as to equally spaced apart from each other in the circumferential direction, and so as to extend parallel to the principal inertial axis of the mass member, for example.

In this mode of the invention, the center of gravity of the mass member is preferably located close to the general principal elastic axis of the plurality of elastic support members, for thereby stabilizing the vibration attitude of the mass member, e.g., preventing or minimizing a rotative or a tilting motion of the mass member when the dynamic damper is subjected to the vibration in the direction perpendicular to the central axes of the elastic support members. Thus, the dynamic damper of this mode is able to exhibit a desired vibration damping effect in a further effective and stable manner. In order to locate the general principal elastic axis of the elastic support members close to the center of gravity of the mass member, the mass member may be arranged so as to protrude toward the mounting member around the elastic support members.

(9) A dynamic damper according to the above-indicated mode (6), wherein a general principal elastic center of the plurality of elastic support members extends parallel to a central axis of the steering column. In this mode of the invention, the dynamic damper is subjected to vibrations applied thereto in various radial directions perpendicular to the central axis of the elastic support members. Since each elastic support member extends parallel to the central axis of the steering column with a circular shape in cross section, the dynamic damper can exhibit the desired vibration damping effect with high stability when the direction of the applied vibration is changed upon rotation of the steering wheel.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
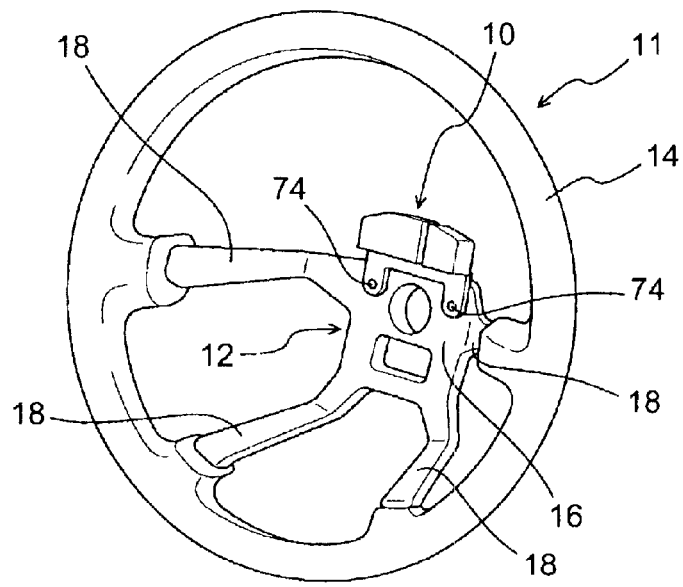
FIG. 1 is a schematic view of a dynamic damper for steering system, constructed according to a first embodiment of the present invention, where the dynamic damper is fixed to a steering wheel of the steering system.
Figure 2:
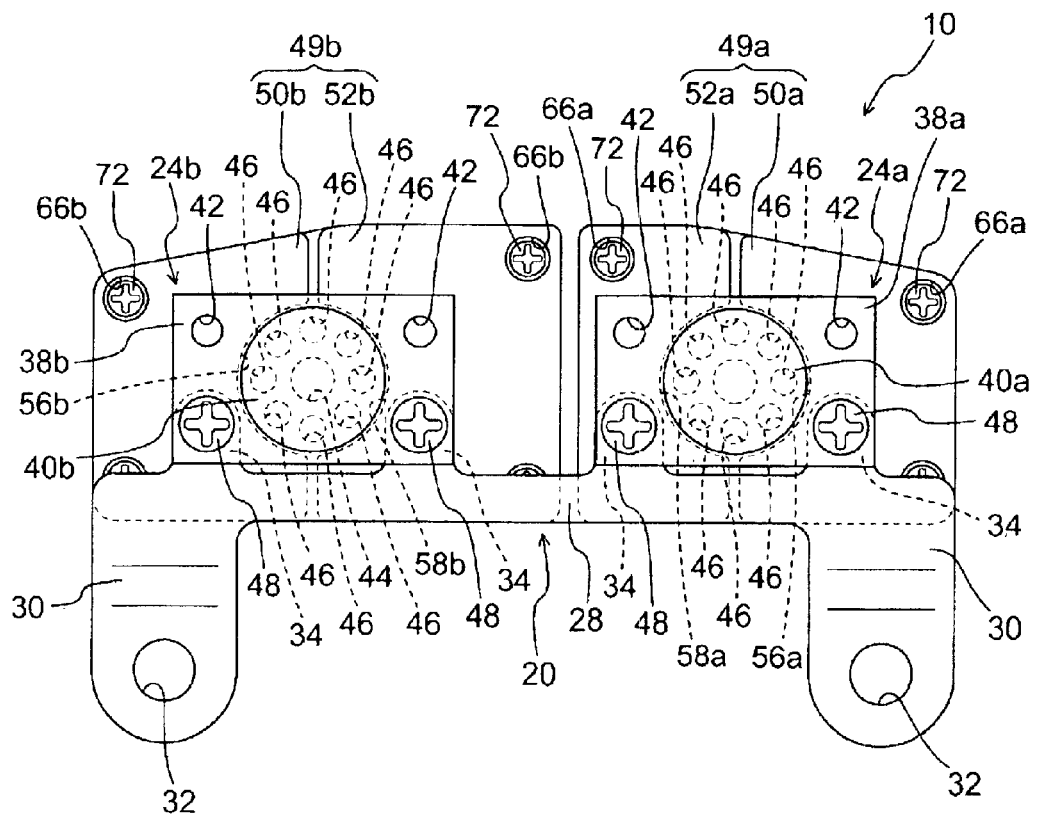
FIG. 2 is a front elevational view of the dynamic damper of FIG. 1.
Figure 3:
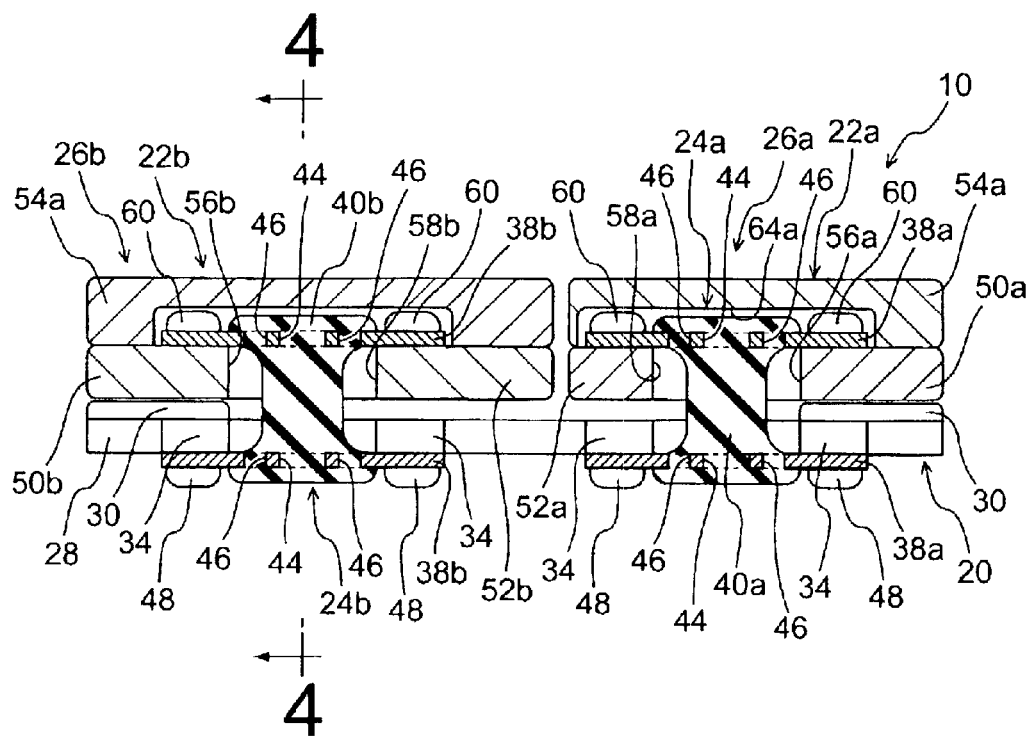
FIG. 3 is a cross sectional view of the dynamic damper of FIG. 2 taken along line 3—3 of FIG. 4.
Figure 4:
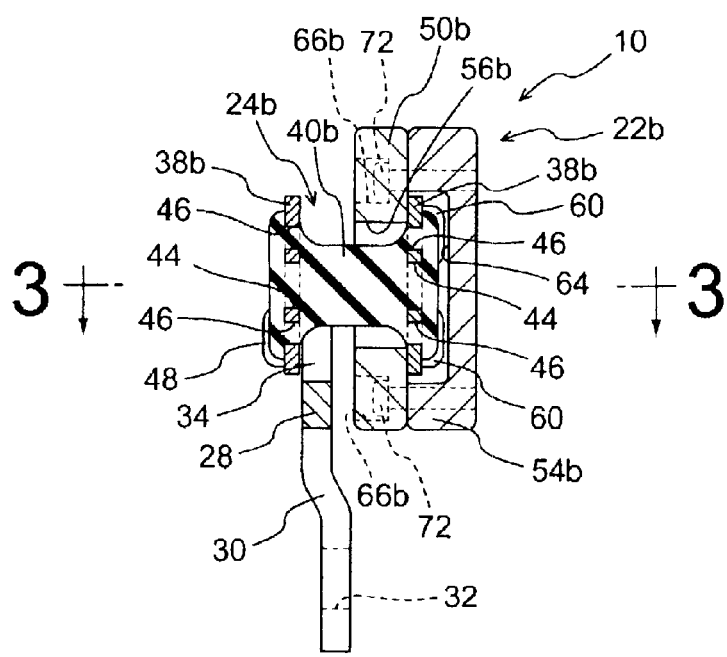
FIG. 4 is a cross sectional view taken along line 4—4 of FIG. 3.

FIG. 1 shows a dynamic damper 10 for use in a steering system of an automotive vehicle, which is constructed according to a first embodiment of the present invention, wherein the dynamic damper 10 is installed on a vibrative member in the form of a steering wheel 11. FIGS. 2–4 show the dynamic damper 10 of FIG. 1 in respective cross sections.

Described more specifically, the steering wheel 11 includes a reinforcing member 12 made of light metal such as an aluminum alloy or a magnesium alloy and a covering layer made of synthetic resin or the like that covers the exterior surface of the reinforcing member 12. Also, the reinforcing member 12 is composed of an annular ring part 14, a boss part 16 positioned in the approximately center of the reinforcing member 12, and a plurality of spokes 18 by which the ring part 14 and the boss part 16 are integrally connected with each other. The boss part 16 is adapted to be fixed to an end of a main shaft that is supported by a steering column (not shown) of the steering system. An operator of the vehicle turns the steeling wheel 11 in order to steer vehicle's wheels via the main shaft. In the present embodiment, the steeling wheel 11, the main shaft, the steering column, a turning switch fixed to the steering column, and the other possible members may cooperate to form a steeling system functioning as a primary vibration system. The dynamic damper 10 of the present embodiment is adapted to be installed on the steering system constructed in this manner.

This dynamic damper 10 has a structure in which mass members in the form of damper masses 22a and 22b are elastically supported via spring members in the form of elastic coupling members 24a and 24b as a plurality of elastic support members, on a mounting member in the form of a bracket 20 adapted to be fixed to the reinforcing member 12 of the steering wheel 11. With the dynamic damper 10 attached to the steeling wheel 11 via the bracket 20, the dynamic damper 10 provides two secondary vibration systems 26a, 26b on the steering system as the primary vibrating system.

Referring to FIGS. 2 through 4, the bracket 20 is made of metal or other rigid material, and has a construction in which the body part 28 having a long blade shape includes a pair of mounting arms 30, 30 and a plurality of (four in this embodiment) mounting projections 34 integrally provided such that the mounting arms 30 and the mounting projections 34 protrude on both sides along the widthwise dimension. Described in detail, the mounting arms 30 are integrally formed at longitudinally opposite ends of the body part 28 so as to protrude on one side along the widthwise direction (downward in FIG. 2). Each of the mounting arms 30 has an approximately rectangular, planar shape, and is slightly bent in the central portion in the protruding direction, while being provided with a bolt hole 32 at the end of the protruding portion. Further, mounting projections 34, 34, 34, 34 are integrally formed in four mutually spaced apart locations along the longitudinal direction of the body part 28 so as to protrude in the direction (upward in FIG. 2) of one side on the widthwise dimension of the body part 28. Each of the mounting projections 34 has an approximately rectangular, planar shape, and is equipped with a mounting hole 36 at the end of its protrusion.

On the other hand, the elastic coupling members 24a and 24b are approximately identical with each other in shape and construction, and each is composed of a pair of fixing metal members 38, 38 and a coupling rubber member 40. Each of the pair of fixing metal member 38, 38 is formed of a thin, rectangular, planar metal member with approximately the same shape, and is provided with bolt through-holes 42 being formed in the four corners of each fixing metal member 38. Each fixing metal member 38 is also formed with a central through hole 44 and a plurality of connecting holes 46 located radially outward of the central through hole 44, and are arranged in the circumferential direction at regular intervals. The coupling rubber member 40 is a solid rod member extending axially and straightly with an approximately constant circular cross sectional shape in its entirety. This coupling rubber member 40 is interposed between the pair of fixing metal members 38, 38 that are opposed to each other with a given spacing therebetween, and is bonded at its axially opposite end faces to the opposing surfaces of the pair of the fixing metal member 38, 38 in the process of vulcanization of a rubber material for forming the coupling rubber member 40. As a result, the elastic coupling members 24a, 24b are formed as integrally vulcanized assembly of the coupling rubber member 40 furnished with the pair of fixing metal members 38, 38. When the axially opposite end faces of the coupling rubber member 40 are bonded to the opposing surfaces, namely inside surfaces of the fixing metal members 38, 38, respectively, in the above mentioned vulcanization process, the rubber material for forming the coupling rubber member 40 extends outward through the central through hole 40 and the plurality of connecting holes 46, and is bonded to the outside surfaces of the fixing metal members 38, 38 so as to close the opening of the central through holes 40 and the plurality of connecting holes 46 of the fixing metal members 38, 38. Accordingly, the pair of fixing metal members 38, 38 are firmly bonded to the axially opposite end portions of the coupling rubber member 40 such that the fixing metal members 38 are partially embedded within the axially opposite end portions of the coupling rubber member 40, respectively. As a result, an increase in the adhesive power of the coupling rubber member 40 to the fixing metal member 38, 38 can be advantageously achieved. In the present embodiment, the pair of fixing metal members 38, 38 of each elastic coupling member 24(a, b) are positioned so as to be almost completely overlapping on the projection in the axial direction of the sandwiched coupling rubber member 40, and the elastic coupling member 24(a, b) has a symmetrical shape in its entirety. This arrangement makes it possible to eliminate a problem of the directionality of the elastic coupling members 24a, 24b, where elastic coupling members 24a, 24b are assembled with the bracket 20 and the damper masses 22a, 22b, thus assuring an improved efficiency in assembling the elastic coupling members 24a, 24b with the other members.

The elastic coupling member 24a constructed as described above is fixedly assembled with the bracket 20 such that one of the fixing metal members 38 of the elastic coupling member 24a is superposed on and fixed to two mounting projections 34, 34 provided on one side in the longitudinal direction, e.g., on the right-hand side as seen in FIG. 2 of the bracket 20, by means of mounting bolts 48, 48, which are screwed into the mounting holes 36, 36 provided on these mounting projections 34, 34 and the bolt throughholes 42, 42 provided on the lower side of the fixing metal members 38. Likewise, the elastic coupling member 24b is fixedly assembled with the bracket 20 such that one of the fixing metal members 38 of the elastic coupling member 24b is superposed on and fixed to two mounting projections 34, 34 provided on the other side in the longitudinal direction, e.g., on the left-hand side as seen in FIG. 2 of the bracket 20, by means of mounting bolts 48, 48, which are screwed into the mounting holes 36, 36 provided on these mounting projections 34, 34 and the bolt through-holes 42, 42 provided on the lower side of the fixing metal members 38.

Also, the elastic coupling members 24a, 24b are fixedly assembled with the damper masses 22a, 22b, respectively. Each of the damper masses 22(a, b) has a thick walled approximately rectangular block shape in its entirety, and is made of a high gravity metallic material such as iron or the like. The damper masses 22a, 22b are approximately identical with each other in their height dimension and thickness dimension, but the width dimensions, i.e., the lengthwise dimensions parallel to the longitudinal direction of the bracket 20, are made different from each other. Namely, the width dimension of the damper mass 22b is made larger than the width dimension of the damper mass 22a. Further, each of the damper masses 22(a, b) includes an interior mass member 49(a, b) and an exterior mass member 54(a, b). In other words, approximately the central portion in the thickness direction of each damper mass 22(a, b) is constructed with an interior mass member 49(a, b) provided on the side of the elastic coupling member 24(a, b) and an exterior mass member 54(a, b) provided so as to protrude outward in the axial direction from the elastic coupling member 24(a, b). These interior and exterior mass members 49(a, b), 54(a, b) are superposed on each other at their opposing surfaces, and bolted together to thereby constitute the damper mass 22(a, b).

Each interior mass member 49(a, b) has a divided structure, namely is divided into an exterior division unit 50(a, b) and an interior division unit 52(a, b), which are opposed to each other with the elastic coupling member 24 interposed therebetween in the width direction of the interior mass member 49(a, b). Each exterior division unit 50(a, b) is an approximately rectangular thick-walled plate member and provided with a cutout portion 56(a, b) extending over the entire thickness thereof with a semicircular cross section and open in the surface opposing the interior division unit 52(a, b). Likewise, the interior division unit 52(a, b) is an approximately rectangular thick-walled plate member and provided with a cutout portion 58(a, b) extending over the entire thickness thereof with a semicircular cross section and open in the surface opposing the exterior division unit 50(a, b). The exterior and interior division units 50(a, b), 52(a, b) constructed as described above are opposed to each other with a slight spacing interposed between the opposing surfaces thereof so that the cutout portions 56(a, b), 58(a, b) open in the opposing surfaces cooperate to form a storage space with a large diameter in which the elastic coupling member 24(a, b) is disposed concentrically with a slight radial spacing interposed between the outer circumferential surface of the elastic coupling member 24(a, b) and the inner circumferential surface of the cutout portions 56(a, b), 58(a, b). The mutually opposed exterior and interior division units 50(a, b) 52(a, b) are firmly fixed to the other fixing metal member 38(a, b), which is away from the bracket 20, by means of attachment bolts 60, which are screwed into the bolt holes 62 provided in the interior and exterior division units 52(a, b) 50(a, b) and bolt holes 42 provided in the fixing metal member 38(a, b). In other words, the use of the above-described interior mass member 49(a, b) with a divided structure, makes it possible to dispose the interior mass member 49(a, b) so as to surround the elastic coupling member 24(a, b).

On the other hand, the exterior mass member 54(a, b) has an approximately rectangular, planar shape, larger in the thickness dimension than the interior mass member 49(a, b), and is furnished with a recess 64(a, b), opening in the surface to be superposed on the interior mass member 49(a, b). Thus, when the exterior mass member 54(a, b) is superposed on the interior mass member 49(a, b), the fixing metal member 38(a, b) that protrudes axially outwardly when superposed on the surface of the interior mass member 49(a, b) and the head of the attachment bolts 60 screwed into the fixing metal members 38(a, b) are hosed within the recess 64(a, b). This arrangement makes it possible for the exterior mass member 54(a, b) to be superposed closely on the surface of interior mass member 49(a, b), and to reduce the amount of axially outward protrusion of the exterior mass member 54(a, b) from the elastic coupling member 24(a, b). The exterior mass member 54(a, b) superposed on the interior mass member 49(a, b) is integrally connectedly fixed by means of bolts 72 which extend through exterior mass member 54(a, b) from a plurality of receiving holes 66(a, b) provided in the peripheral portion of the interior mass member 49(a, b). Thus, the damper mass 22(a, b) is constructed.

In the present embodiment, the damper masses 22a, 22b have different width dimensions, so that the masses of damper masses 22a, 22b are made different from each other. More specifically, the dimension in the width direction of the damper mass 22a is made smaller than that of the damper mass 22b, as a result of which the mass of the damper mass 22b is made larger than the mass of the damper mass 22a.

These damper masses 22a, 22b are elastically connected to the bracket 20 via the elastic coupling members 24a, 24b, respectively, thereby providing two secondary vibration systems 26a, 26b independent of each other, as described above. According to the present embodiment, the natural frequency of the secondary vibration system 26a is tuned to the natural frequency of the steering system that is larger than 30 Hz, while the natural frequency of the secondary vibration system 26b is tuned to a frequency of idling vibrations that is held within a range of 20 Hz–30 Hz. In the dynamic damper 10 of the present embodiment, each of the secondary vibration systems 26(a, b) is arranged such that the principal elastic axis of the coupling rubber member 40(a, b) of the elastic coupling member 24(a, b) is approximately conformity with the principal inertial axis of the corresponding damper mass 22(a, b), while the center of gravity of the damper mass 22(a, b) is set in a position close to the elastic center of the coupling rubber member 40(a, b).

The dynamic damper 10 constructed as described above is mounted on the boss part 16 of the reinforcing member 12 of the steering wheel 11, such that the central axes of the coupling rubber members 40a, 40b of the elastic coupling members 24a, 24b extend parallel to the central axis of the steering wheel or column, and is fastened to the boss part 16 by means of bolts 74, 74, which are inserted into the bolt holes 32, 32 formed in the fixing members 30, 30 of the bracket 20.

The dynamic damper 10 constructed according to the present embodiment is able to exhibit an excellent vibration damping effect not only to the idling vibrations with the help of resonance of the secondary vibration system 26b, but also to the vibration of the natural frequency of the steering system with the help of resonance of the secondary vibration system 26a. Therefore, the dynamic damper 10 is capable of exhibiting a suitable damping effect with respect to vibrations excited in the steering wheel, especially in the recent automotive vehicles where the frequencies of the vibrations excited in the steering wheel is likely to change depending upon running conditions or idling condition of the vehicles.

Another advantageous feature of the present embodiment is that vibrations to be damped are primarily applied to the dynamic damper 10 in the direction perpendicular to the central axis of the steering column, that is, in the direction perpendicular to the axes of the coupling rubber member 40a, 40b. As a results, the coupling rubber members 40a, 40b thus undergo shearing deformation, and it becomes possible to reduce the spring constant of coupling rubber members 40a, 40b in the vibration input direction.

Thus, the dynamic damper 10 of the present embodiment is able to achieve an excellent vibration damping effect with respect to vibrations having relatively low frequencies, such as the idling vibrations or the vibrations of the natural frequency of the steering system, as well, without needing an enlargement of the damper masses 22a, 22b and/or deteriorating the durability of coupling rubber members 40a, 40b.

Yet another advantageous feature of the present embodiment is that each coupling rubber member 40(a, b) of the corresponding elastic coupling member 24(a, b) has a circular shape in cross section in the direction perpendicular to the central axis of the steering column. This arrangement makes it possible for the dynamic damper 10 to exhibit an approximately constant vibration damping effect with respect to vibrations applied thereto in all radial directions perpendicular to the central axis of the steering column. Thus, the dynamic damper 10 is capable of exhibiting an excellent vibration damping effect if the vibration input direction changes due to the turning of the steering wheel 11, for example.

Still another advantageous feature of the present embodiment is that the exterior and interior division units 50(a, b), 52(a, b) of each interior mass unit 49(a, b) as a component of the corresponding damper mass 22(a, b) are located on the side of the bracket 20 rather than the exterior mass 54(a, b). This arrangement makes it possible to effectively and compatibly obtain the sufficient mass of the damper mass 22(a, b) and the sufficient free length of the coupling rubber member 40(a, b). As a result, the dynamic damper 10 is made compact in size, thus effectively preventing interference of the damper mass 22 with components other than the damper mass 22 when the dynamic damper 10 is installed on the steering system.

A further advantageous feature of the present embodiment is that the interior mass members 49a, 49b of the damper masses 22a, 22b are located on the side of the bracket 20 rather than the exterior mass members 54a, 54b, respectively. This makes it possible to bring the center of gravity of the damper masses 22a, 22b close to the elastic center of the coupling rubber members 40a, 40b of the elastic coupling members 24a, 24b, resulting in a stabilized vibration damping effect.

A still further advantageous features of the present embodiment is that the principal elastic axis of each coupling rubber member 40(a, b) of the elastic coupling member 24(a, b) is approximately conformity with the principal inertia axis of the corresponding damper mass 22(a, b). This makes it possible for the dynamic damper 10 to stabilize the vibrational status of the damper mass 22(a, b) upon application of the vibrational load in the direction perpendicular to the central axis of the steering column. Thus, the dynamic damper 10 can exhibit a desired vibration damping effect with high stability.

Figure 5:
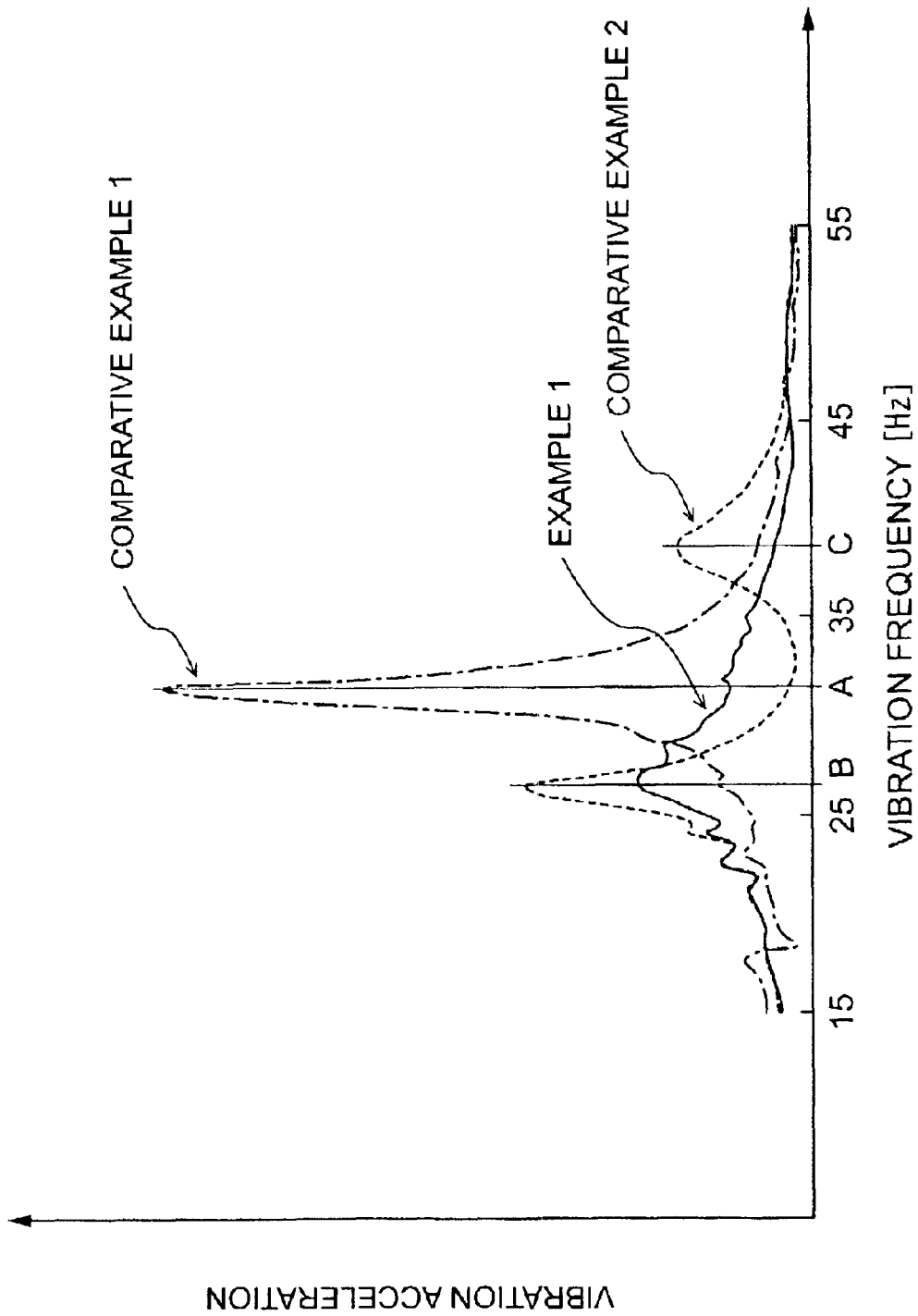
FIG. 5 is a graph showing a measurement of frequency characteristics of vibration acceleration of the dynamic damper of FIG. 2, together with the same measurements with respect to Comparative examples.

FIG. 5 shows, as Example 1, the results of measuring of the frequency characteristics of the vibrations of the steering wheel when the dynamic damper 10 constructed as described above, is fixed to the steering wheel 11, and a frequency sweep vibration application is performed at an acceleration of ±0.29 G. Also, the same measurement tests were conducted for a steering wheel with no dynamic damper attached, and a steering wheel with a conventional dynamic damper including a single second vibration system, consisting of a single mass member and a single spring member, whose resonance frequency is tuned to the frequency band of the natural vibration of the steering wheel. The respective measurement results are also shown in FIG. 5 as comparative example 1 and comparative example 2.

As is apparent from the measurement results shown in FIG. 5, the conventional dynamic damper (comparative example 2) can achieve recognizably an excellent vibration damping effect with respect to the vibration with a vibration frequency of "A", which has been a problem in the case where no dynamic damper is attached (comparison example 1). However, the conventional dynamic damper causes deterioration of the vibration condition of the steering wheel 11, namely generates new vibrations on both the low frequency side (vibration frequency "B") and the high frequency side (vibration frequency "C") of the vibration with a vibration frequency of "A". These vibration frequencies "B" and "C" are approximately the same as the idling vibration frequency and the steering system natural frequency of the recent automotive vehicle. Accordingly, the conventional dynamic damper attached to the steering wheel 11 worsens the vibrational status as compared with the case in which no dynamic damper is attached as to both the idling vibration frequency and the steering natural vibration frequency. On the other hand, the dynamic damper 10 constructed according to the present invention (example 1) can an excellent vibration damping effect with respect to not only vibrations with a vibration frequency of "A", which are a problem in comparison example 1, but also vibrations with vibration frequency "C" corresponding to the steering system natural vibration frequency and vibrations with vibration frequency "B" corresponding to the idling vibration frequency, which became a problem in comparison example 2.

Referring next to FIGS. 6 through 9, there is shown a dynamic damper 76 for use in a steering system of an automotive vehicle, which is constructed according to a second embodiment of the present invention. This dynamic damper 76 has a structure in which mass members in the form of damper masses 80a, 80b, 80c are all elastically connected to a mounting member in the form of a bracket 78 adapted to be fixed to a steering column or steering wheel (not shown in the figure), via spring members in the form of elastic coupling members 82a, 82b, 82c as a plurality of elastic support members. With the dynamic damper 76 attached to the steering column or the steering wheel, the dynamic damper 76 provides three secondary vibration systems 86a, 86b, 86c on the steering system as the primary vibration system.

Figure 6:
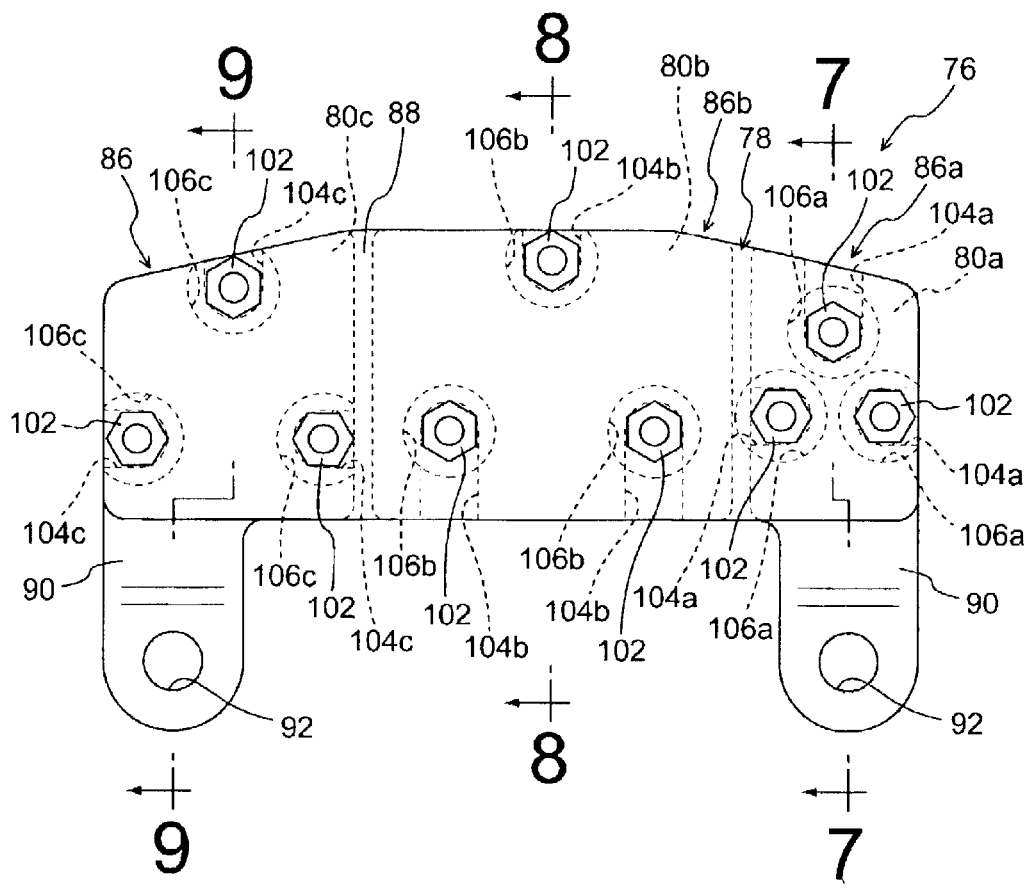
FIG. 6 is a front elevational view of a dynamic damper constructed according to a second embodiment of the present invention.
Figure 7:
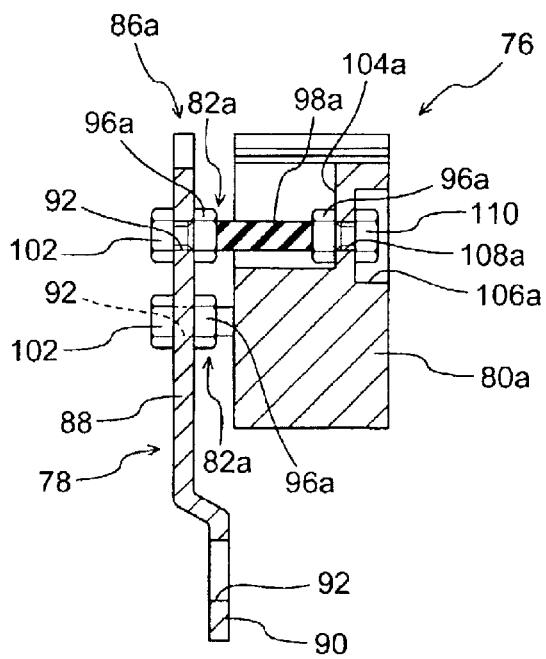
FIG. 7 is a cross sectional view taken along line 7—7 of FIG. 6.
Figure 8:
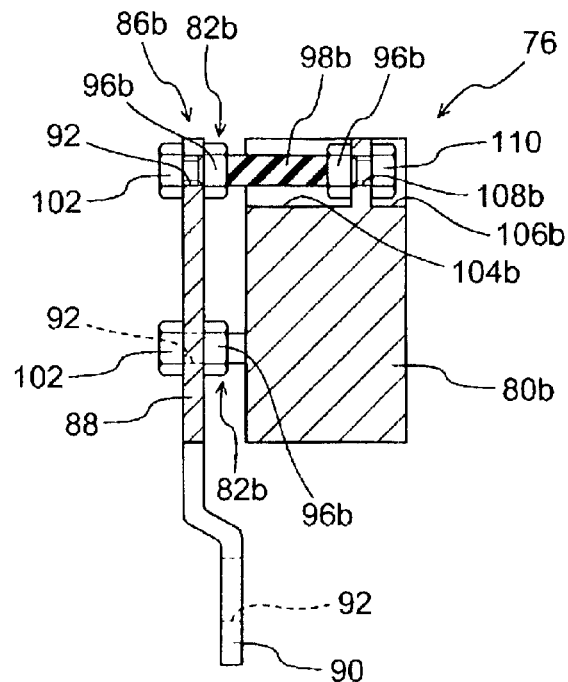
FIG. 8 is a cross sectional view taken along line 8—8 of FIG. 6.
Figure 9:
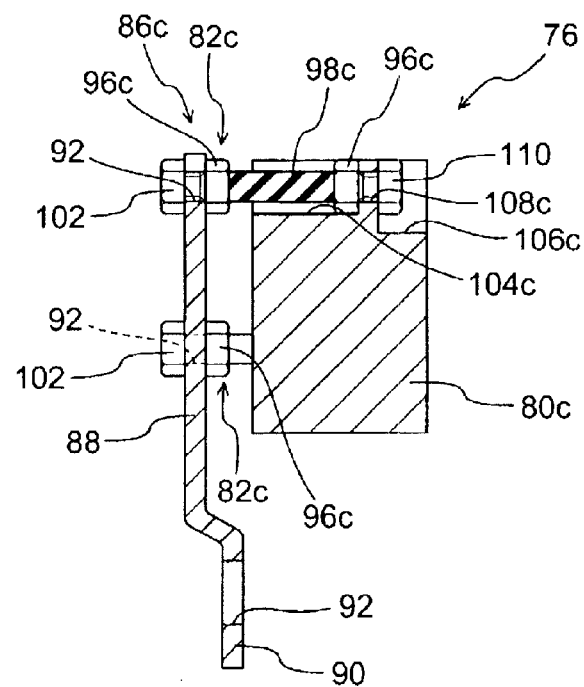
FIG. 9 is a cross sectional view taken along line 9—9 of FIG. 6.

Described more specifically, the bracket 78 is made of metal or other rigid material, and has a construction in which a body part 88 has a long blade shape and a pair of mounting arms 90, 90 integrally formed at longitudinally opposite ends thereof so as to protrude on one side along the widthwise direction (downward in FIG. 6). The body part 88 has the longitudinally opposite end portions where width dimension of the body part 88 gradually tapers or is gradually reduced in the longitudinally outward direction. Also, mounting arms 90, 90 both have an approximately planar shape in its entirety, while being bend into a flat crank shape at their central portions in the protruding direction of the mounting arms 90, 90. Bolt holes 92, 92 are formed through the protruding end portions of the mounting arms 90, 90, respectively. The body part 88 is provided with a plurality of through holes 94 (three in the present embodiment) formed in opposite end portions and the central portion in the longitudinal direction.

Figure 10:
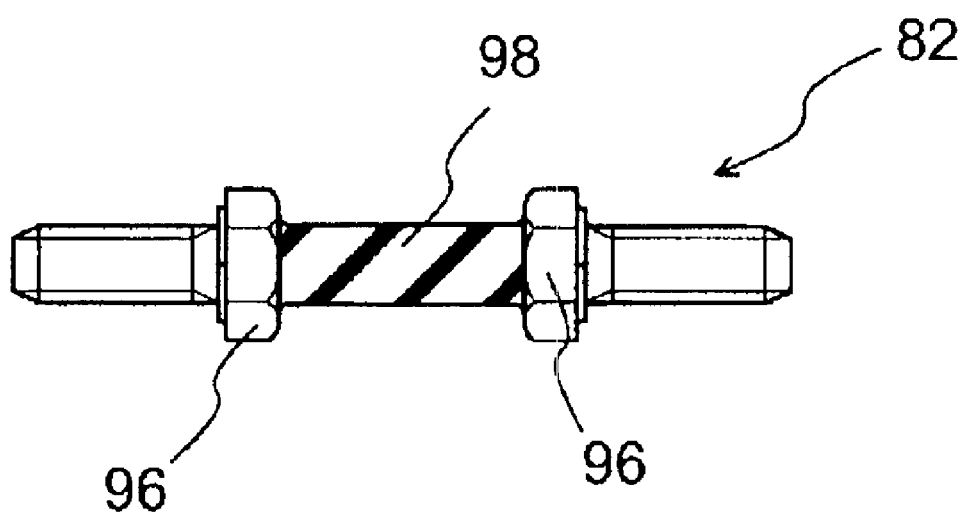
FIG. 10 is a front view of an elastic coupling member of the dynamic damper of FIG. 6.

As shown in FIG. 10, each elastic coupling member 82 includes two bolts 96, 96 and a coupling rubber member 98. The coupling rubber member 98 is a solid rod member extending straightly in the axial direction with an approximately constant circular shape in cross section. The coupling rubber member 98 is bonded at its axially opposite end faces to the axial end faces of the heads of the respective bolts 96, 96, upon vulcanization of a rubber material for forming the coupling rubber member 98. As a result, the coupling rubber member 98 and the two bolts 96, 96 cooperate to form an integral vulcanized product (elastic coupling member 82). In the thus formed integral vulcanized product (elastic coupling member 82), the two bolts 96, 96 and the rubber coupling member 98 are disposed in a coaxial or concentric relationship with each other. Moreover, in the present embodiment, all of the coupling rubber members 98 are approximately identical with each other in terms of shape, size, and material. One of the two bolts 96, 96 of the elastic coupling member 82 extends through the corresponding through hole 94 formed through the bracket 78, and a nut 102 is screwed onto the bolt 96 so that the elastic coupling member 82 is thus bolted onto the bracket 78.

On the other hand, each damper mass 80(a, b, c) is formed of iron or other high gravity materials, and has a rectangular block shape in its entirety. Each damper mass 80(a, b, c) is provided with a plurality of cutouts 104 (three in this embodiment) that are open in one of opposite sides thereof and located in the peripheral portion thereof. Each of the cutouts 104 extends with an approximately constant shape in cross section over a given length. Also, each damper mass 80 is provided with receiving holes 106, which are open in the other side thereof, and are located in portions corresponding to the cutouts 104. Each of the receiving holes 106 extends along a given length, with an approximately constant circular shape in cross section. The cutouts 104 and the receiving holes 106 are mutually connected in the depth direction via connecting holes 108, respectively. In the present embodiment, the depth dimension of the receiving holes 106 (e.g., in the thickness direction of the damper mass 80) is made sufficiently smaller than the depth dimension, the cutouts 104 (i.e., in the thickness direction of the damper mass 80).

In the present embodiment, the damper masses 80a, 80b, 80c have mutually differing dimensions in the lengthwise or longitudinal direction (in the horizontal direction as seen in FIG. 6). As a result, the masses of the damper masses 80a, 80b, 80c are made different from one another. More specifically, the lengthwise dimension of the damper mass 80a is the smallest, while the lengthwise dimension of the damper mass 80b is the largest. Thus, the mass of the damper mass 80a is made smallest, while the mass of the damper mass 80b is made largest. Further, the widthwise dimensions of the damper masses 80a, 80c decreases in the longitudinally outward directions so as to match with the body part 88 of the bracket 78.

While ones of the two bolts 96, 96 of the plurality of elastic coupling members 82 are fastened to the bracket 78 as described above, the other ones of the two bolts 96, 96 of the plurality of the elastic coupling members 82 are inserted into a plurality of connecting holes 108 formed through the damper masses 80a, 80b, 80c, respectively from the side of the cutouts 104. Nuts 110 are screwed onto the bolts 96, respectively, so that the damper masses 80a, 80b, 80c are bolted onto the elastic coupling members 82. As a result, the damper masses 80a, 80b, 80c are elastically supported on the bracket 78 via the plurality of elastic coupling members 82, thus providing three secondary vibration systems 86a, 86b, 86c, which are independent of one another. In a state where each damper mass 80(a, b, c) is elastically connected to the bracket 78 via the three elastic coupling members 82, the general principal elastic axis of the three elastic coupling members 82 is approximately conformity with the principal inertial axis of the damper mass 80(a, b, c), and the center of gravity of the damper mass 80(a, b, c) is located on the side of the bracket 78. With each damper mass 80(a, b, c) connected with the bracket 78 via the three elastic coupling members 82 as described above, the nuts 110 are housed within the receiving holes 106, respectively, thus effectively preventing the nuts 110 from protruding outward from one of opposite surfaces of the damper masses 80 remote from the bracket 78.

In the present embodiment, the natural frequency of the secondary vibration systems 86a, 86b, 86c are tuned respectively to a second natural frequency of the steering system that has been changed from a first natural frequency as a result of change in the tilt position or the like, the idling vibration frequency, and the first natural frequency of the steering system.

The dynamic damper 76 constructed as described above is installed on the steering column or the steering wheel such that the central axes of the plurality of coupling rubber members 98a, 98b, 98c of the elastic coupling units 82a, 82b, 82c extend parallel with the central axis of the steering column, and is firmly fixed at the mounting arms 90, 90 of the bracket 78 by means of bolts (not shown) inserted through bolt holes 92, 92 formed through the mounting arms 90, 90.

In the dynamic damper 76 constructed as described above, the idling vibration, steering vibration, and steering vibration in which the frequency range has been changed as a result of changes in the status of the steering system caused by changes in the tilt position or the like can be reduced by the vibration damping effect on the basis of resonance of the secondary vibration systems 86b, 86c, 86a, respectively. Like the first embodiment, the dynamic damper 76 of the present embodiment can suitably damp vibrations of the steering wheel with high stability, especially in the recent vehicles where the frequencies of the vibrations excited in the steering wheel changes depending upon running conditions or idling condition of the vehicle.

In the present embodiment, since the vibrations to be damped are primarily applied to the dynamic damper 76 in the direction perpendicular to the central axis of the steering column, that is in the direction perpendicular to the axes of the coupling rubber members 98a, 98b, 98c of the elastic coupling members 82, the coupling rubber members 98a, 98b, 98c undergo shearing deformation, thus reducing the spring constant of the coupling rubber members 98a, 98b, 98c in the vibration input direction.

Another advantageous feature of the present embodiment is that each damper mass 80(a, b, c) is elastically supported on the bracket 78 via the plurality (e.g., three in the embodiment) of the elastic coupling members 82, and the rotation and tilting of the damper mass 80(a, b, c) are suppressed, whereby the damper mass 80(a, b, c) is supported in a stabilized state. This makes it possible for the dynamic damper 76 to exhibit a stabilized vibration damping effect. Moreover, the dynamic damper 76 makes it possible to keep the spring constant small while ensuring stability of the vibration displacement status of the damper mass 80(a, b, c), ensuring an excellent vibration damping effect especially with respect to low-frequency vibrations such as idling vibrations or the natural frequencies of the steering system.

Like the first embodiment, the approximately constant cross-sectional shape of the coupling rubber member 98 is made circular in the direction perpendicular to the central axis of the steering column. Therefore, the dynamic damper 76 exhibits the approximately the same spring constants in any directions perpendicular to the central axis of the steering column, which is the primary vibration input direction, and the excellent vibration damping effect with respect to input vibrations in the all radial directions. Thus, the dynamic damper 76 of the present embodiment can exhibit a stable vibration damping effect even in the case, for example, where the vibration input direction changes as a result of the steering wheel turning or the like.

In the present embodiment, the coupling rubber member 98 of each elastic coupling member 82 is positioned with the corresponding cutout 104 formed in the damper mass 80, making it possible to compatible achieve the sufficient free length of the coupling rubber member 98 and the sufficient ass of the damper mass 80(a, b, c), while restricting at the same time the amount of projection of the damper mass 80 from bracket 78. This arrangement makes the dynamic damper 76 compact in size, thus effectively preventing the damper mass 80 from interfering with the other components when the dynamic damper 76 if installed.

Yet another advantageous feature of the present embodiment is that the coupling rubber members 98 of the elastic coupling members 82 are housed within the cutouts 104 of the each damper mass 80(a, b, c), making it possible to bring the center of gravity of the damper mass 80(a, b, c) close to the elastic center of the plurality of coupling rubber members 98, thereby controlling or restricting the rotative or tilting displacement of the damper mass 80(a, b, c) and exhibiting a stabilized vibration damping effect.

Figure 11:
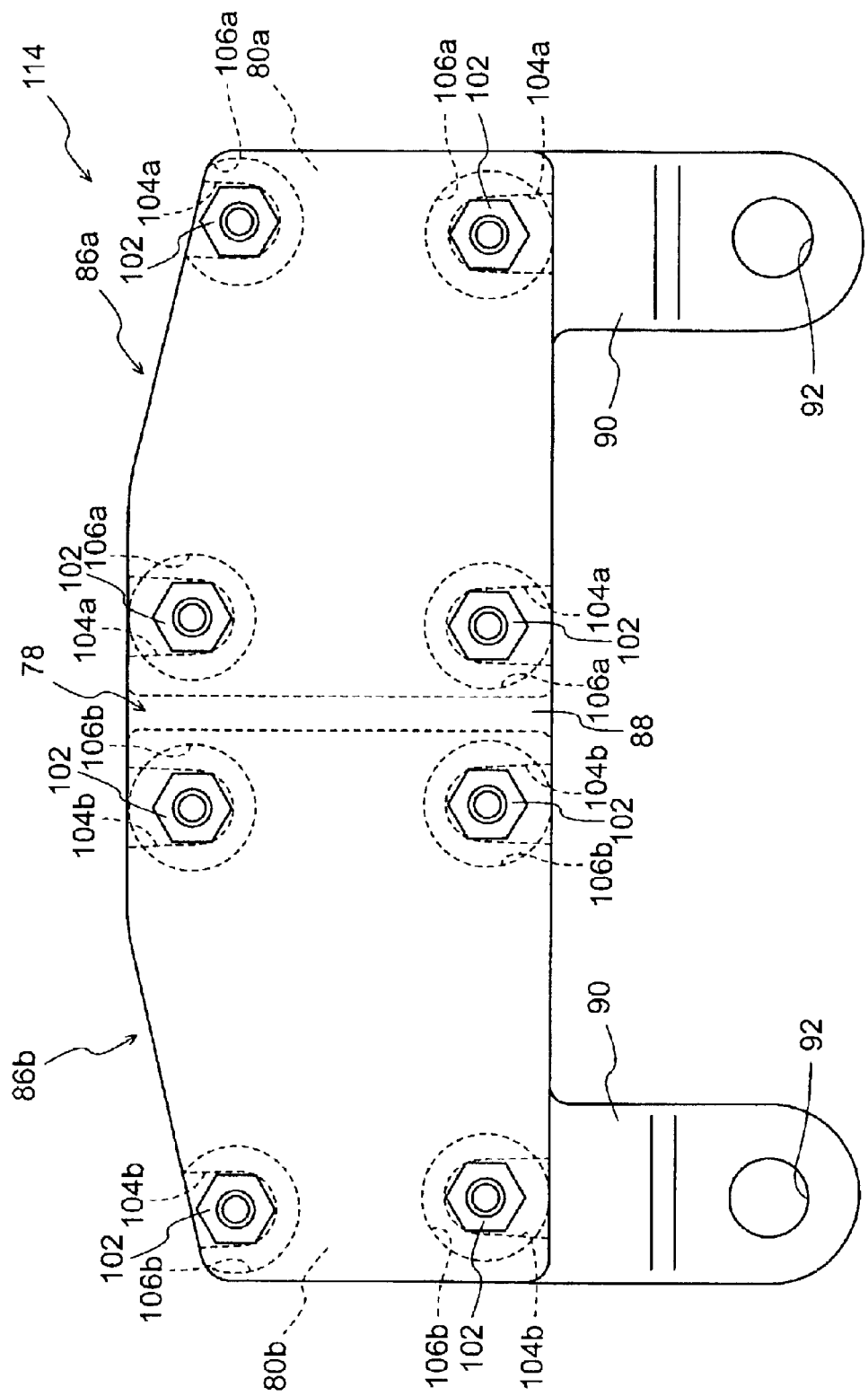
FIG. 11 is a front elevational view of a dynamic damper constructed according to a third embodiment of the present invention.
Figure 12:
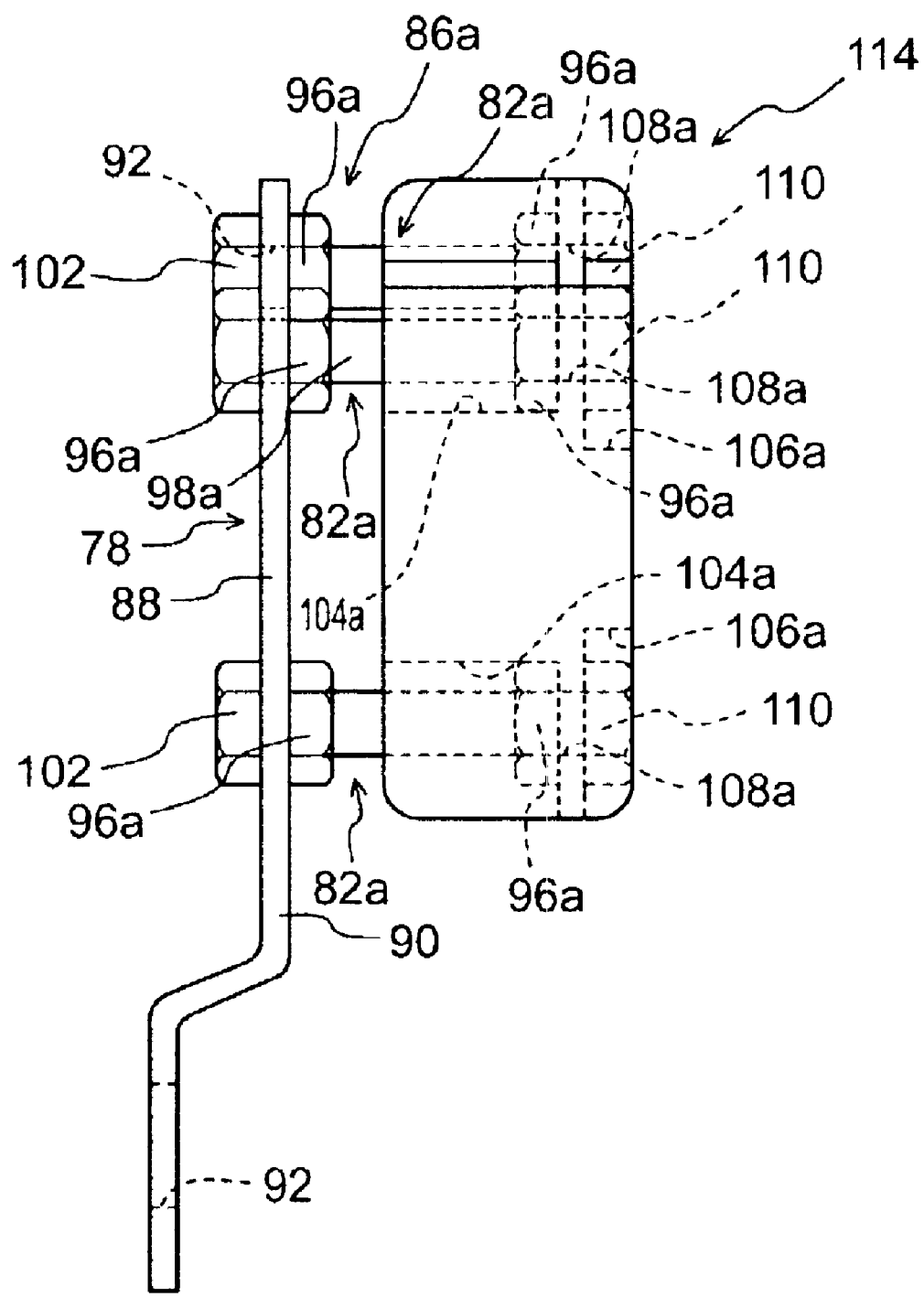
FIG. 12 is a right-side elevational view of the dynamic damper of FIG. 11.

Referring next to FIGS. 11 and 12, there is shown a dynamic damper 114 for use in a steering system of an automotive vehicle, which is constructed according to a third embodiment of the present invention. The same reference numerals as used in the first and second embodiments will be used in FIGS. 11 and 12 to identify the functioning corresponding elements. In the interest of simplification, redundant description of these elements will not be provided.

The dynamic damper 114 of the present embodiment includes two damper masses 80a, 80b, which are approximately identical with each other in terms of weight. Like the first and second embodiments, the damper masses 80a, 80b are elastically supported on the bracket 78 via a plurality of the elastic-coupling members 82a, 82b, respectively (e.g., four in the present embodiment). Unlike the first and second embodiment, the elastic-coupling members 82a, 82b are made of different materials. With the dynamic damper 114 fixedly installed on the steering column or the steering wheel of the vehicle, in the same manner as in the first or second embodiment, the damper mass 80a and the elastic coupling members 82a cooperate to provide a secondary vibration system 86a, and the damper mass 80b and the elastic coupling members 82b cooperate to provide the secondary vibration system 86b. Since the spring characteristics of the elastic coupling members 82a, 82b are made different from each other due to the difference of materials, the secondary vibration systems 86a, 86b are tuned to different frequency ranges, e.g., a frequency of the idling vibration and a natural frequency of the steering system.

With the dynamic damper 114 installed on the steering column or the steering wheel, the central axes of the elastic coupling members 82a, 82b extend parallel to the central axis of the steering column. Namely, vibrations to be damped is applied to the dynamic damper 114 in the direction perpendicular to the central axes of the elastic coupling members 82a, 82b.

In the dynamic damper 114 of the present invention, each elastic coupling member 82(a, b) extends parallel to the central axes of the steering wheel with a generally constant circular cross section, like the first and second embodiments, making it possible for the dynamic damper 114 to exhibit a desired vibration damping effect irrespective of the vibration input direction that varies due to the turning of the steering wheel.

While the present invention has been described in detail with its presently preferred embodiments for the illustrative purpose only, it is to be understood that the invention is not limited to the details of the illustrated embodiments, but may be otherwise embodied.

For example, the double-mass type dynamic damper as shown in the above-described first embodiment, may possibly employ a structure in which a single mass component is elastically supported on the bracket via a plurality of spring components as in the second embodiment. Likewise, the triple-mass type dynamic damper as shown in the above described second embodiment, may possibly employ a structure in which a single mass component is elastically supported on the bracket via a single spring component, as in the first practical embodiment. When a single mass component is elastically supported via the plurality of spring components, the number of spring components is not limited to the number in the illustrated second embodiment, but more than three is also employable.

Further, the first embodiment may be modified to eliminate the use of one of the pair of fixing metal members 38 of the each elastic coupling member 24. Namely, each elastic coupling member 24 may be directly bonded to the mass member upon vulcanization of the rubber material of the elastic coupling member 24.

While each interior mass member 49 is disposed around corresponding elastic coupling member 24 in the first embodiment, each mass member may be modified so as to protrude toward the outside in the axis direction from the protruding end surfaces of the corresponding elastic coupling member 24. Alternatively, each mass member may be modified so as to protrude toward the inside in the axis direction from the protruding end surfaces of the corresponding elastic coupling member 24.

While the center of gravity of each mass component is positioned close to the elastic center of the corresponding spring member in the illustrated embodiments. This arrangement is not essential for practicing the present invention.

Further, the mass member and the spring member employed in the dynamic damper of the present invention may be suitably arranged taking into account, a condition of the space to which the dynamic damper is installed as well as a range of frequency of vibrations to be damped, but may not be limited to those in the illustrated embodiment. For instance, it is also possible to employ a mass component with a circular cross-section or a spring component with a polygonal cross-section, and it is also possible, of course, to change the shape of the bracket accordingly.

Figure 13:
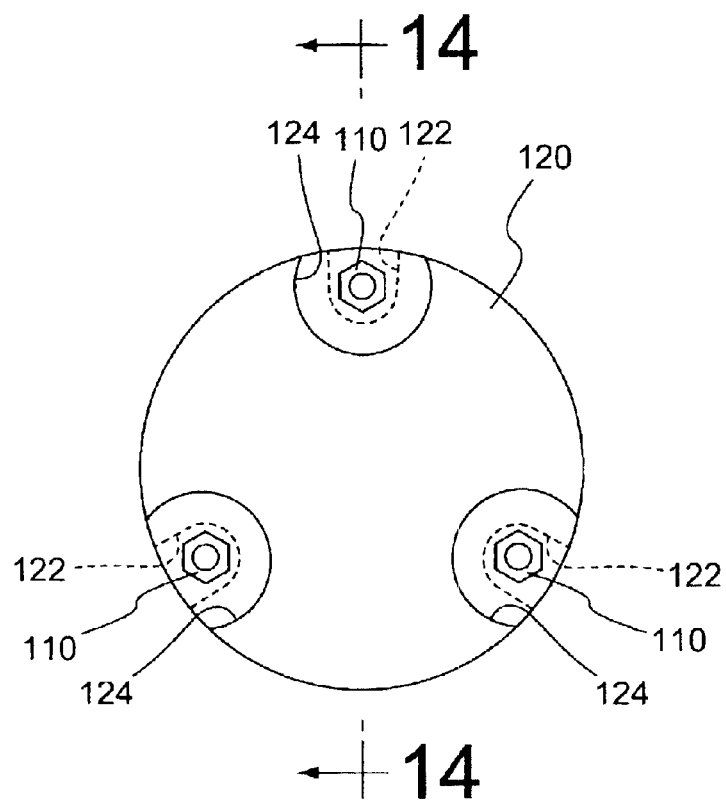
FIG. 13 is a top plane view of a mass member adoptable in a dynamic damper of the present invention.
Figure 14:
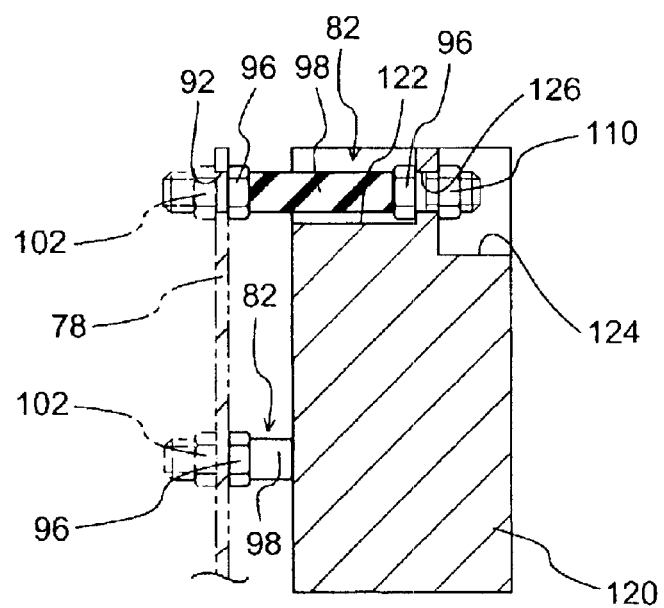
FIG. 14 is a cross sectional view taken along line 13—13 of FIG. 13.

FIGS. 13 and 14 show a cylindrical mass member 120 that is adoptable in the present invention, by way of example. The mass member 120 may be a solid cylindrical member made of iron or other high gravity rigid metallic materials, extending straightly in its axial direction with an approximately constant circular cross section in its entirety. The mass member 120 is provided with a plurality (e.g., three in this embodiment) of first cutouts 122 each being formed at a circumferential portion in its peripheral portion and open in its circumferential surface while extending from its axially intermediate portion to its one axial end (left-hand end as seen in FIG. 14) with an approximately constant cross sectional shape. The first cutouts 122 are equally spaced apart from one another in the circumferential direction of the mass member 120. The mass member 120 is also provided with a plurality (e.g., three in this embodiment) of second cutouts 124 respective circumferential portions corresponding to the first cutouts 122. Namely, the second cutouts 124 extend from the axially intermediate portion to the other axial end (right-hand end as seen in FIG. 14) of the damper mass 124 with an approximately constant cross sectional shape. Each of the second cutouts 124 is held in connecting with the corresponding first cutout 122 via a connecting hole 126 formed through the mass member 120 in the axial direction. The first cutouts 122 have an axial length that is made sufficiently larger than that of the second cutouts 124, so that an amount of projection of the mass member 120 from the bracket is effectively reduced.

The thus formed cylindrical mass member 120 is elastically supported on the bracket 78 by a plurality (e.g., three in this embodiment) of elastic coupling members 82, like the illustrated embodiments. Namely, ones of the opposite end bolts 96 of the elastic coupling members 82 are fastened to the bracket 78, and the other ones of the opposite ends bolts 96 are inserted through the respective connecting holes 126 formed through the damper mass 124, from the side of the first cutouts 122, and are threaded engaged with respective nuts 102, whereby the elastic coupling members 82 are firmly bolted to the mass member 120 as well. Accordingly, the mass member 120 is elastically supported by the three elastic coupling members 82 on the bracket 78, for example. Like in the illustrated embodiment, the elastic coupling members 82 elastically supporting the cylindrical mass member 120 are disposed on the steering column or the steering wheel so as to extend parallel to the central axis of the steering column. In this state, an general principal elastic axis of the three elastic coupling members 82 is approximately conformity with the principal inertia axis of the cylindrical mass member 120. Also, the center of gravity of the cylindrical mass member 120 is located on the side of the bracket 78. It should be appreciated that the use of the cylindrical mass member 120 makes it possible to eliminate a problem of the directionality of the mass member, thus assuring a further stabilized damping effect even in the case, for example, where the vibration input direction changes as a result of the steering wheel turning or the like.

Figure 15:
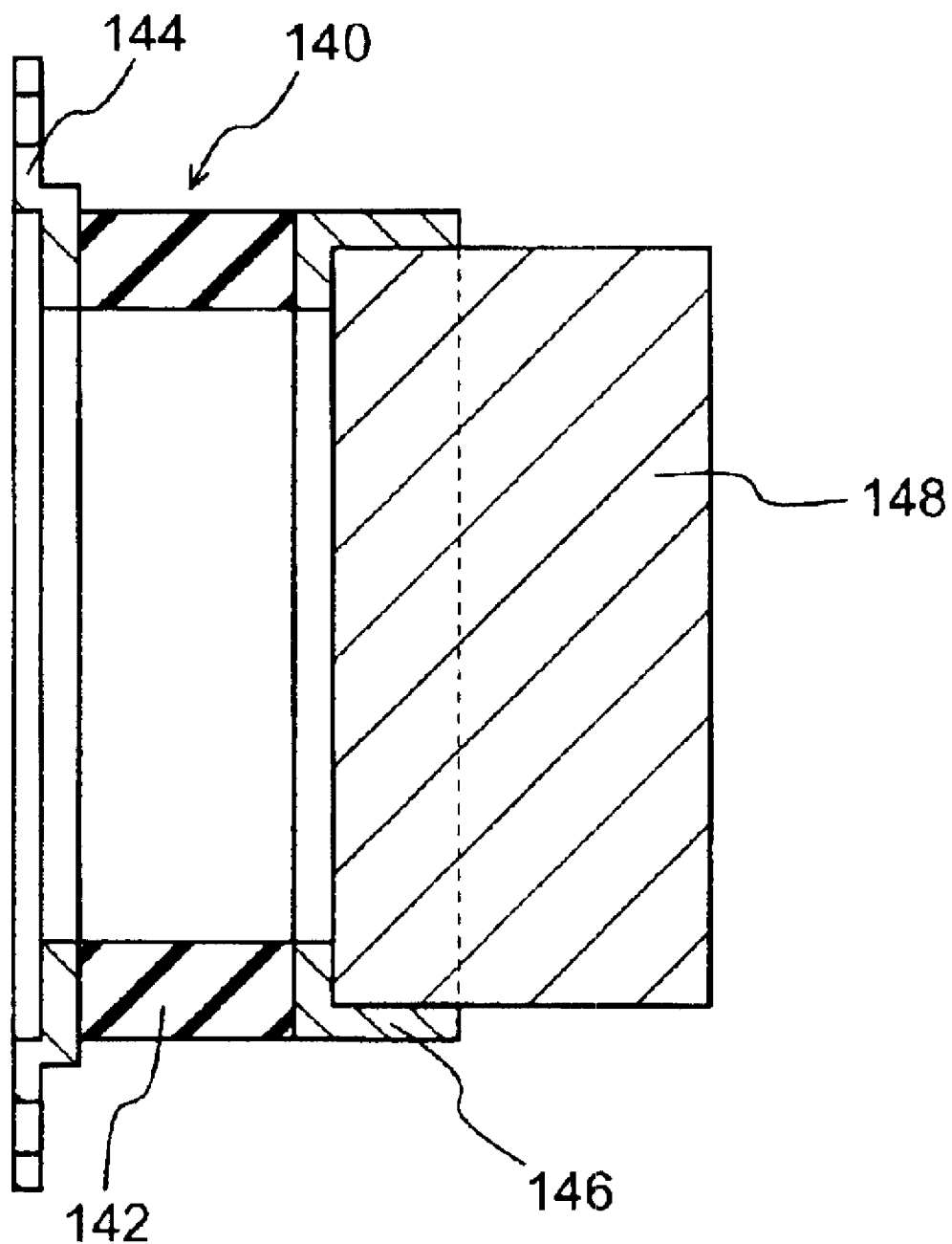
FIG. 15 is an axial cross sectional view of a spring member adoptable in a dynamic damper of the present invention.

While the spring member, e.g., the elastic coupling members 24, 82, have a solid cylindrical shape in the illustrated embodiment, the spring member of the present invention may have a variety of shapes. For instance, the spring member includes a hollow cylindrical elastic coupling member 140 as shown in FIG. 15 in its vertical or axial cross section. Described in detail, the hollow cylindrical elastic coupling member 140 includes a hollow cylindrical coupling rubber member 142 having a relatively large diameter, a metallic annular mounting member 144 bonded to one of axially opposite end faces of the coupling rubber member 142 upon vulcanization of a rubber material for forming the coupling rubber member 142, and a metallic annular fixing member 146 bonded to the other end faces of the coupling rubber 142 in the same vulcanization process. The annular mounting member 144 may be firmly bolted to the steering column or the steering wheel directly or via a suitable bracket member. On the other hand, a solid cylindrical mass member 148 is forcedly pressed into the bore of the annular fixing member 146, whereby the cylindrical mass member 148 is elastically supported by the cylindrical elastic coupling member 140 on the steering column or the steering wheel. In this case, the principal elastic axis of the cylindrical elastic coupling member 140 is approximately conformity with the principal inertial axis of the cylindrical mass member 148. The adoption of the cylindrical elastic coupling member 140 as well as the cylindrical mass member 148 may allow the dynamic damper of the invention to exhibit further stabilized damping effect.

It is also to be understood that the present invention may be embodied with various other changes, modification sand improvements, which may occur to those skilled in the art, without departing from the spirit and scope of the invention defined in the following claims.

What is claimed is:

1. A dynamic damper for use in a steering system of an automotive vehicle, comprising:

a mounting member adapted to be fixed to a steering column or a steering wheel of the steering system; and a plurality of secondary vibration systems each including a mass member and a spring member for elastically supporting said mass member with respect to said mounting member, said plurality of secondary vibration systems being independent of each other, wherein at least one of said plurality of secondary vibration systems has a natural frequency that is tuned to an idling vibration frequency band ranging from about 20 Hz to about 30 Hz, and at least an other one of said plurality of secondary vibration systems has a natural frequency that is tuned to a natural frequency band of the steering system, which is larger than 30 Hz, wherein in at least one of said secondary vibration systems, said spring member is formed as a unit independent of said mass member and including a coupling elastic member and a first and a second fixing member integrally bonded to said coupling elastic member, while said mass member is formed with a cutout or recess, and wherein said first fixing member is fixed to an inside of said cutout or recess while the second fixing member is fixed to said mounting member so that said spring member is partially situated within said cutout or recess.

2. A dynamic damper according to claim 1, wherein the steering wheel of the steering system includes a reinforcing member made of light metal including an aluminum alloy and an magnesium alloy.

3. A dynamic damper according to claim 1, wherein said spring member of each of the secondary vibration systems whose natural frequencies are tuned to said idling vibration frequency band and said natural frequency band of the steering system, comprises an elastic support member adapted to undergo shear deformation in a direction perpendicular to a central axis of the steering column.

4. A dynamic damper according to claim 3, wherein said elastic support member of each of said secondary vibration systems whose natural frequencies are tuned to said idling vibration frequency band and said natural frequency of said steering system, has a circular shape in cross section in said direction perpendicular to said central axis of the steering column.

5. A dynamic damper according to claim 3, wherein at least one of said each of said secondary vibration systems is arranged such that said elastic support member has a principal elastic axis that is approximately in conformity with a principal inertia axis of said mass member in a direction in which said mass member and said mounting member are opposed to each other.

6. A dynamic damper according to claim 1, wherein said spring member of at least one of said plurality of secondary vibration systems comprises a plurality of elastic support members extending parallel to each other while having a circular shape in cross section.

7. A dynamic damper according to claim 6, wherein a vibrational load is applied to said dynamic damper in various radial directions approximately perpendicular to center axes of said plurality of elastic support members.

8. A dynamic damper according to claim 6, wherein said plurality of elastic support members are located close to an outer peripheral portion of said mass member rather than a center of gravity of said mass member, in a plane perpendicular to center axes of said plurality of elastic support members.

9. A dynamic damper according to claim 6, wherein a general principal elastic center of said plurality of elastic support members extends in a direction of central axes of said plurality of elastic support members, and is approximately in conformity with a principal inertia axis of said mass member.

10. A dynamic damper according to claim 6, wherein a general principal elastic center of said plurality of elastic support members extends parallel to a central axis of the steering column.

11. A dynamic damper according to claim 1, wherein said spring member of at least one of said plurality of said second vibration systems comprises three spring members which are made identical with each other.

12. A dynamic damper according to claim 1, wherein said mass member of at least one of said plurality of said second vibration systems has a circular shape in cross section perpendicular to a central axis of the steering column.

13. A dynamic damper according to claim 1, wherein said spring member of at least one of said plurality of said second vibration systems has a hollow cylindrical shape.

14. A dynamic damper according to claim 1, wherein in each of said secondary vibration systems, said mass member is formed with a plurality of said cutouts that are open in an outer peripheral portion of said mass member, respectively, and is elastically supported on said mounting member via a plurality of said spring members partially situated within said plurality of said cutouts, respectively.

15. A dynamic damper according to claim 1, wherein said coupling elastic member extends longitudinally with an approximately constant circular cross sectional shape, and said first and second fixing member integrally bonded to axially opposite end faces of said coupling elastic member, respectively, while at least one of said first and second fixing members is shaped as a bolt extending axially outwardly from a corresponding one of said axially opposite end faces said coupling elastic member.

16. A dynamic damper according to claim 1, wherein in each of said secondary vibration systems, said mass member is formed with said recess open in a central portion thereof, and is elastically supported on said mounting member via said spring member partially situated within said recess.

17. A dynamic damper according to claim 1, wherein said coupling elastic member extends longitudinally with an approximately constant circular cross sectional shape, and said first and second fixing member integrally bonded to axially opposite end portions of said coupling elastic member, respectively, while at least one of said first and second fixing members is shaped as a fixing plate extending in a direction perpendicular to an axis of said coupling elastic member, said fixing plate being provided with a plurality of through holes so that said fixing plate is partially embedded in a corresponding one of said axially opposite end portions of said coupling elastic member, and being fixed to said mass member or said mounting member at an peripheral portion thereof.

18. A dynamic damper according to claim 1, wherein said mass member includes a plurality of plates mutually superposed on each other, and said plurality of plates, except a most outer plate, are formed with through holes through which said coupling elastic member extends, and said most outer plate provides a closure of opening of said through holes so as to provide said recess.

19. A dynamic damper according to claim 1, wherein said mounting member is formed with a through hole, and said coupling elastic member extends through said through hole of said mounting member so that said second fixing member is fixed to a back surface of said mounting member, which is remote from said mass member.

* * * * *